United States Patent [19]

Hartley

[11] Patent Number: 5,366,315

[45] Date of Patent: Nov. 22, 1994

[54] RETENTION AND RELEASE MECHANISM FOR FIBER OPTIC ALIGNMENT SLEEVE RETAINER

[75] Inventor: James T. Hartley, Tustin, Calif.

[73] Assignee: Hughes Aircraft Company, Los Angeles, Calif.

[21] Appl. No.: 116,591

[22] Filed: Aug. 26, 1993

Related U.S. Application Data

[62] Division of Ser. No. 960,602, Oct. 13, 1992, Pat. No. 5,265,182.

[51] Int. Cl.⁵ .................... H01R 13/00; F16B 17/00
[52] U.S. Cl. ..................... 403/326; 403/20; 403/321; 403/325; 439/345
[58] Field of Search .......... 403/19, 20, 13, 17, 403/18, 321, 325, 326, 330; 285/29, 28, 39, 308, 310, 317, 137.1; 439/349, 350, 345; 279/80, 79, 76, 2.02, 43.2, 43.5; 174/74 R; 385/55, 59, 60, 71, 77, 85

[56] References Cited

U.S. PATENT DOCUMENTS

| | | | |
|---|---|---|---|
| 1,005,699 | 10/1911 | Engle | 403/13 |
| 1,838,543 | 12/1931 | Goldstein | 279/79 |
| 2,954,994 | 10/1960 | Beers | 403/20 |
| 3,011,794 | 12/1961 | Vaughn | 403/326 |
| 3,328,905 | 4/1968 | Szohatzky | 279/76 |
| 3,439,944 | 4/1969 | Leutenegger | 403/326 |
| 3,678,439 | 7/1972 | Vetter | 403/325 |
| 4,548,455 | 10/1985 | Ezure | 439/345 |
| 4,861,257 | 8/1989 | Siotani | 279/2.02 |
| 5,195,905 | 3/1993 | Pesci | 439/350 |
| 5,265,182 | 11/1993 | Hartley . | |

Primary Examiner—Randolph A. Reese
Assistant Examiner—Anthony Knight
Attorney, Agent, or Firm—Elizabeth E. Leitereg; Terje Gudmestad; W. K. Denson-Low

[57] ABSTRACT

A multiple channel fiber optic connector (44) carries a plurality of fiber optic socket termini (58, 60, 62, 64), each of which includes an alignment sleeve (42) mounted on a forward end. In order to facilitate installation of the alignment sleeves and removal of the sleeves for cleaning of the sleeves (42) and the end (35) of the optical fiber (34) of each socket terminus, the alignment sleeves (42) for each terminus of the connector (44) are all securely mounted in an alignment sleeve carrier (46). The carrier itself is detachably connected to the connector 44 and, when so connected, positions each alignment sleeve on its respective fiber optic terminus. A simply and easily operated latch mechanism (100, 82) latches the carrier to the connector body to hold all of the alignment sleeves in place and is readily operated by a plunger 150, without any type of tool, to enable the carrier together with all of its alignment sleeves to be removed from the connector body and expose the ends (35) of fibers for cleaning.

7 Claims, 3 Drawing Sheets

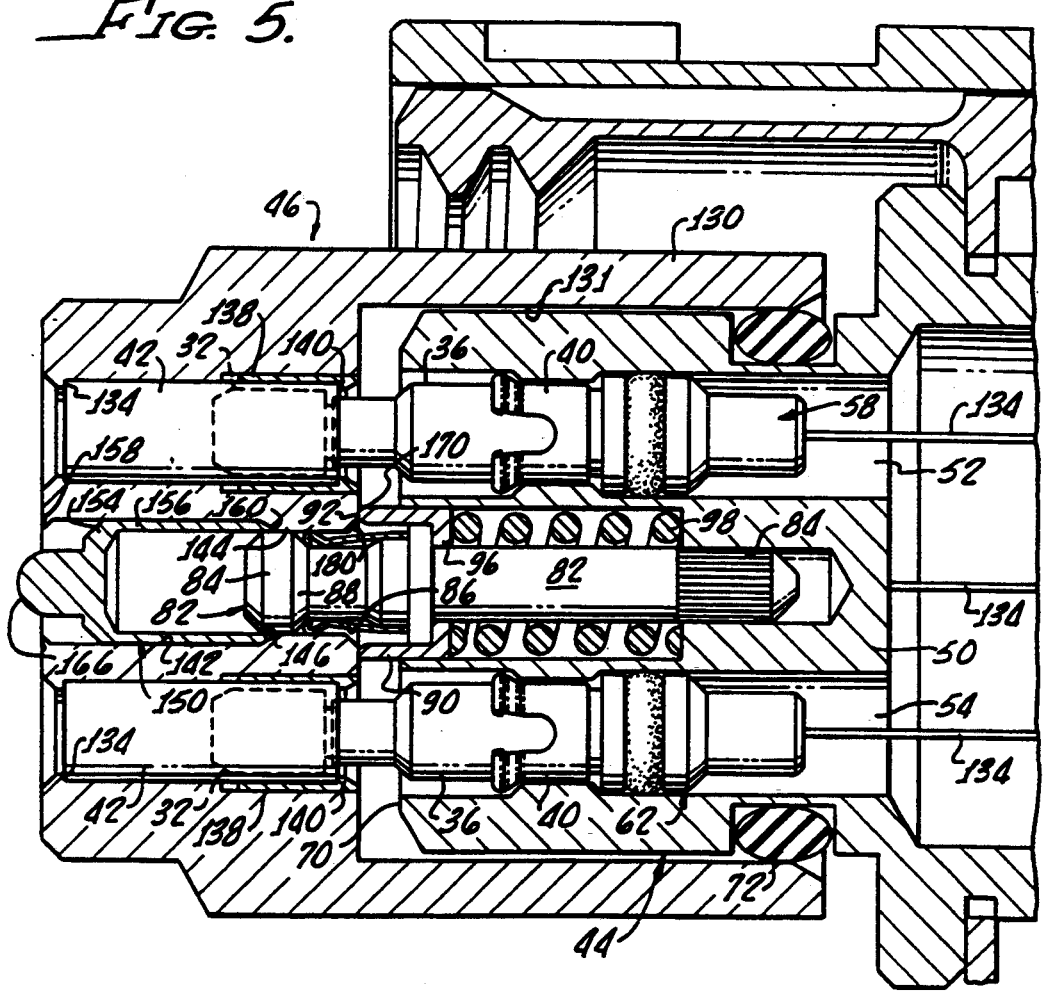
FIG. 5.
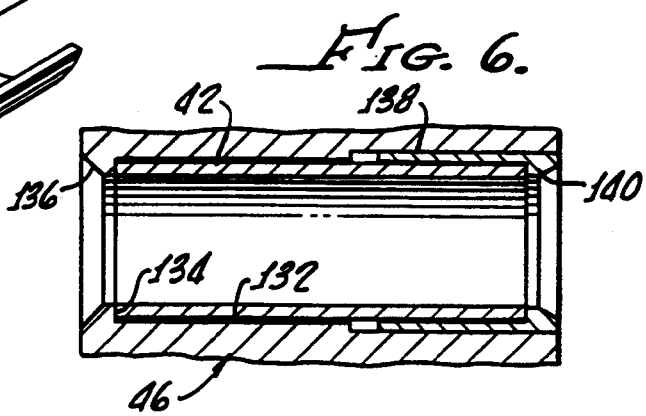
FIG. 4.
FIG. 6.

RETENTION AND RELEASE MECHANISM FOR FIBER OPTIC ALIGNMENT SLEEVE RETAINER

This is a division of application Ser. No. 960,602, filed Oct. 13, 1992, now U.S. Pat. No. 5,265,182.

BACKGROUND OF THE INVENTION

1. Field of the Invention

The present invention relates to fiber optic connections and more particularly concerns mounting of a fiber optic alignment sleeve for quick disconnection and assembly.

2. Description of Related Art

Various type of connections are provided for coupling one optical fiber to another to position flush fiber ends of two fibers against one another for optimum transmission of light across the junction of the two. To interconnect the very small diameter fibers, the fiber ends are generally fixedly mounted in termination structures, generally termed a "terminus", of which a pin terminus and a socket terminus form a mating pair, with the one being received within the other. Effectively the pin and socket interconnection provides for alignment of the two optical fibers by the insertion and guiding of the pin terminus into the receiving end of the socket terminus. The socket terminus frequently carries on its forward end an alignment sleeve that is mounted with an end extending forwardly of the end of the optical fiber end to form a socket for reception of an end of the pin terminus. The end of the fiber of the socket terminus is set back, at some distance from the forward end of the alignment sleeve, and is difficult to clean through the very small diameter sleeve.

When the pin and socket termini are mutually disconnected, small particles of dirt may enter the socket of the alignment sleeve. Even very small particles in the socket can significantly hamper or totally prevent light transmission. To accommodate cleaning of the fiber end, which is set back from the forward end of the sleeve, the alignment sleeves of a socket terminus are generally detachably mounted on the terminus body. Frequently they are made removable only by a specially formed tool. The nature of the construction and the very small size of the termini, which have an outside diameter in the order of 0.040 inches for example, make this removal a difficult and sometimes error prone operation. Where the alignment sleeve is resiliently retained on the terminus body, pulling on the alignment sleeve results in a sudden release of retention force that may cause a sleeve to fly off the terminus to end and come to rest in unknown or difficult to find location at some distance from the terminus.

Attempts have been made to improve and redesign alignment, installation and detachment tools, and to redesign and reconfigure alignment sleeve retaining mechanisms, but the problem with removal and installation of the sleeve remains.

Accordingly it is an object of the present invention to provide an optical fiber terminus in which abovementioned problems are avoided or greatly minimized.

SUMMARY OF THE INVENTION

In carrying out principles of the present invention in accordance with a preferred embodiment thereof, a connector body carries a plurality of fiber optic termini having ends adjacent the forward end of the body with each of the termini ends being configured and arranged to receive an alignment sleeve. An alignment sleeve carrier detachably mounted to the connector body includes a carrier body having a plurality of alignment sleeves mounted in the carrier body, with each sleeve being received on an individual one of the fiber optic termini when the carrier is mounted to the connector. Releasable latch means are provided for detachably holding the carrier on the connector body with the sleeve received on the termini, whereby removal of the carrier from the connector body removes all of the sleeves from the termini.

BRIEF DESCRIPTION OF THE DRAWINGS

In the accompanying drawings:

FIG. 4 is a perspective view of the latching clip.

FIG. 5 is a sectional view of the mechanism for locking the carrier to the connector body, showing the latch mechanism in unlatched position.

FIG. 6 shows a detail of the mounting of an alignment sleeve in the retainer.

DESCRIPTION OF THE PREFERRED EMBODIMENTS

Figure 1:
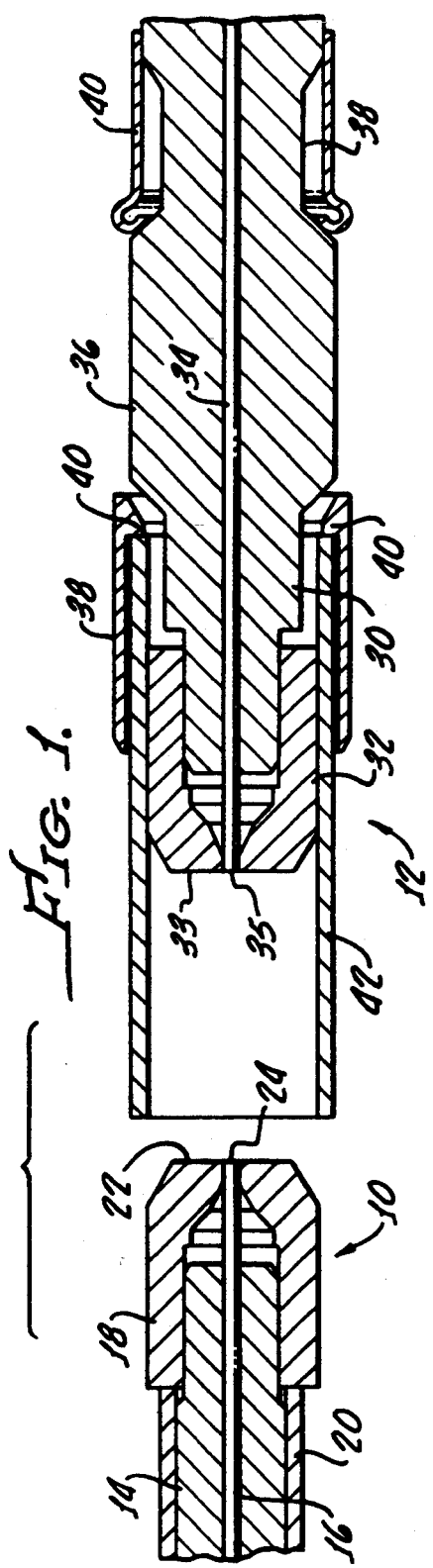
FIG. 1 is an exploded view of ends of parts of a pair of pin and socket termini.

The present invention is applicable to fiber optic termini of many different sizes, shapes and configurations, but will be disclosed in connection with one particular terminus configuration, solely for purposes of exposition, without intending to limit application of the inventive concept to any specific configuration of fiber optic terminus. Shown in FIG. 1 are portions of exemplary pin and socket termini of the type shown more fully in U.S. Pat. No. 5,125,059 for Fiber Optic Terminus, of Stephen W. Wall. This fiber optic connection generally includes a pin terminus 10 and a socket terminus 12. The pin terminus includes a terminus body 14 having a centrally located bore which receives an optical fiber 16. Fixedly mounted to a forward end of the terminus body 14 is a guide bushing 18 to the rear of which is mounted a spacer sleeve 20 circumscribing terminus body 14. Guide bushing 18 includes a planar forward face 22 which is flush with the forward end 24 of optical fiber 16.

The socket terminus generally comprises a similar structure including a terminus body 30, fixedly carrying on its forward end a guide bushing 32 and having an axial bore in which is mounted an optical fiber 34 having a forward end 35 that is precisely coplanar with a forward end 33 of the bushing 32. Socket terminus body 30 includes an externally enlarged mid-section 36 having a recessed portion 38 around which is mounted a terminus retainer sleeve or spring clip 40.

Mounted on the forward of body 30 and extending over guide bushing 32 is an alignment sleeve 42 that fits snugly over the guide bushing 32 and extends forwardly over the terminus body beyond the ends 33 and 35 of the bushing 32 and fiber 34. The optical fibers are fixedly mounted to and within the respective bodies of the pin and socket termini by various types of arrangements, of which one is shown in U.S. Pat. No. 5,125,059. Full and complete details of the pin terminus and the socket terminus are shown in this patent. It will be noted however that the alignment sleeve shown for the socket terminus of U.S. Pat. No. 5,125,059 includes certain external and internal configurations (not employed in the disclosed embodiment, and not shown in the drawings) that resiliently and detachably latch the alignment sleeve to the body and guide bushing of the socket terminus. In the present arrangement, as will be described more particularly below, individual latching of an alignment sleeve with its terminus body or guide bushing is not necessary.

Figure 2:
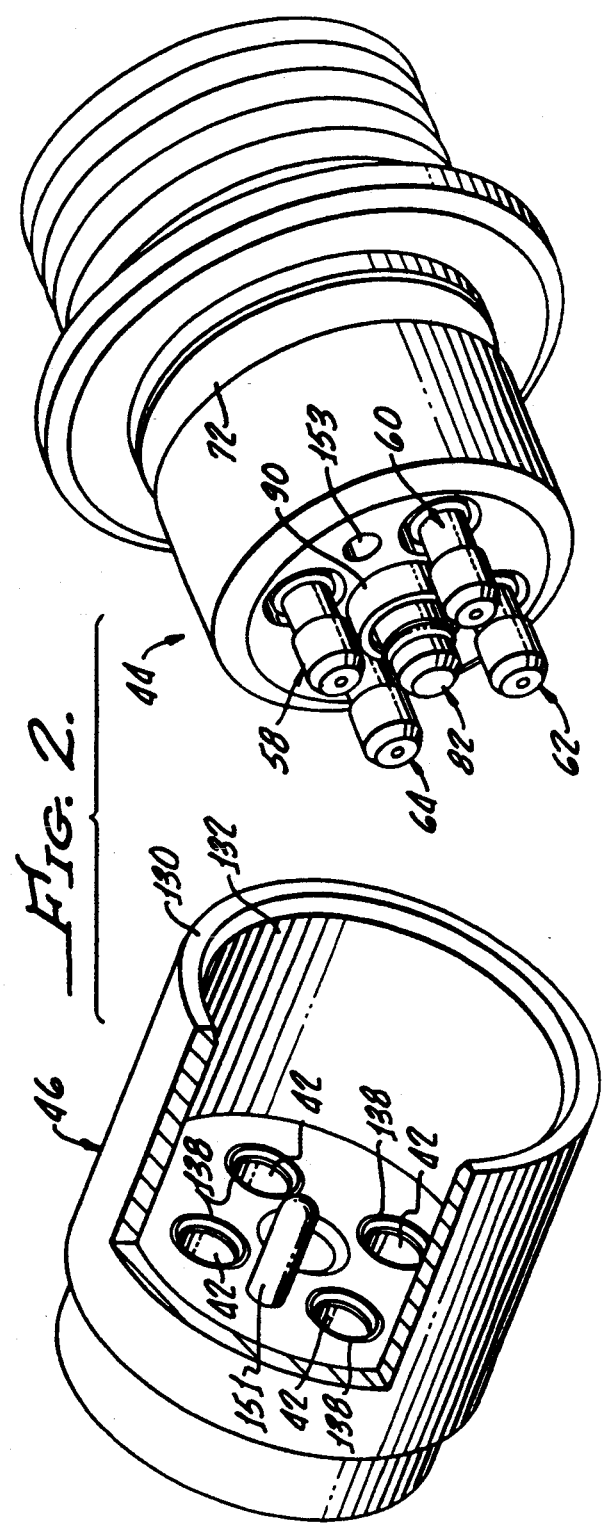
FIG. 2 is an exploded perspective view of a multichannel connector body and alignment sleeve carrier.
Figure 3:
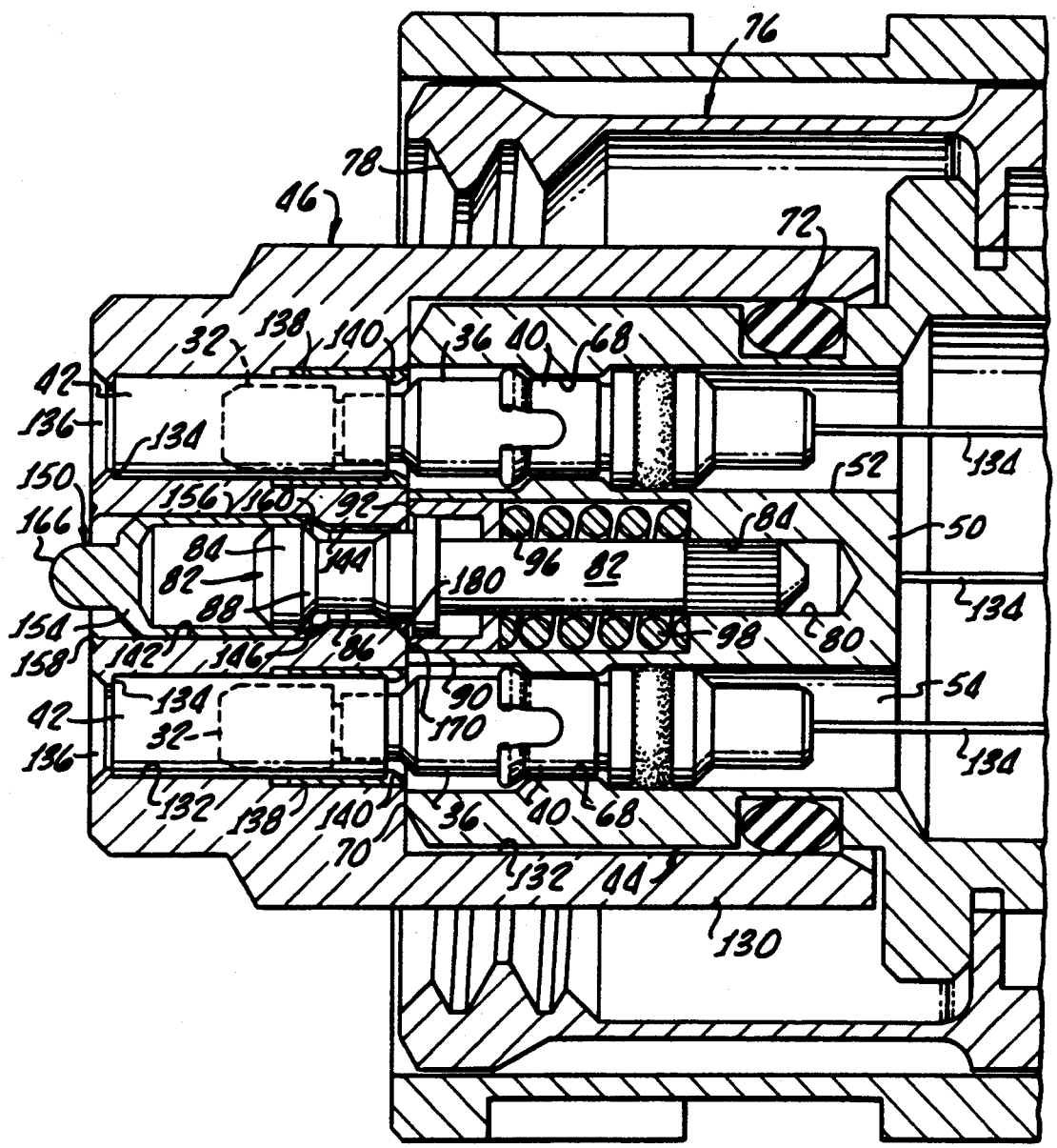
FIG. 3 is a cross section of the assembled connector and carrier of FIG. 2.

In accordance with one feature of the invention, as incorporated in a particularly disclosed embodiment, a plurality of optical fiber socket termini are mounted in a single connector socket part or body 44 (FIG. 2) and the several alignment sleeves for each of the socket termini are fixedly mounted to and within a sleeve carrier 46. The carrier 46 is configured to be detachably mounted to connector part 44, and when so mounted, positions and holds each alignment sleeve on its respective terminus body. The assembly of connector and carrier present a group of completed socket termini mounted in the connector body and ready for connection to a group of similar mating pin termini (not shown) similarly mounted in a second or pin termini connector part (not shown). FIG. 3 shows the assembled group of socket termini in their connector body with sleeve carrier and alignment sleeves attached, all ready for connection to a mating group of pin termini (not shown).

As can be seen in FIG. 3, the socket termini connecting body 44 includes a body section 50 that is formed with a plurality of symmetrically disposed terminus mounting bores (four in the illustrated arrangement) such as bores 52, 54 shown in FIG. 3. Securely mounted within each of these bores are individual ones of a group of socket termini 58, 60, 62 and 64 (FIGS. 2 and 3). Each bore includes an inwardly projecting or reduced diameter section 68 adjacent the spring clip 40 that is mounted on the terminus. The spring clip latches the terminus within the connector body bore so that its forward end including guide bushing 32 protrudes a short distance outwardly beyond the planar front face 70 of body section 50. The forward ends of all guide bushings and fiber ends are co-planar. An O-ring 72 is captured in an external peripheral groove of body section 50 for sealing the installed sleeve carrier. A coupling ring 76 is rotatably mounted on body section 50 and includes an internally threaded forward end 78 adapted to threadedly engage a male threaded part of a multi-channel receptacle connector body (not shown) that carries a plurality of fiber optic pin termini that are to be mated to and optically coupled with the socket termini of connector 44.

Fixedly mounted (as by a press fit) in a centrally and axially directed bore 80 of connector body section 50 is a latching post 82 that projects forwardly of the front face 70 of connector body section 50 (see FIG. 3). A forward part of the post includes a head section 84, a latch section 86 of decreased external diameter and an inclined transition forming a post shoulder 88 between the sections. A pusher cup 90 having a forwardly projecting end 92 has an apertured bottom 96 through which the post projects to slidably mount the cup on the post. A compression spring 98 is captured between the bottom 96 of the pusher cup and the connector body section 50, circumscribing the rearward end of post 82. The spring 98 continually urges the pusher cup 90 forwardly toward the end of the body section 50 (the left side of the body as viewed in FIG. 3).

Mounted on the necked down section 86 of post 82 is a spring clip 100, best seen in FIG. 4. This spring clip may be identical to the clip 40 that holds the socket terminus within the connector body. The spring clip is preferably formed of beryllium, copper or a similar strong resilient and corrosion resistent metal having a longitudinally slit body 102 and a forward end that flares forwardly and radially outwardly into enlarged end portions 104, 106, 108 and 110 which are radially separated from each other by slots such as slots 112 and 114. The enlarged ends 104 through 110 may be formed simply by bending over ends of the separated fingers of the flared end portion. The spring clip has an inner diameter slightly smaller than the outer diameter of the post. Thus the clip is expanded when it is placed on the post and is held in place by its tendency return to its smaller diameter natural state. In this manner the clip is effectively tightly mounted on the post to extend over the necked down section 86 of the post for a limited amount of axial sliding motion.

The detachable alignment sleeve carrier has a generally cylindrical shape with a rearwardly projecting annular outer flange 130 having a bore 131 that closely receives the outer periphery of the connector body section 50. Flange 130 is received within the coupling ring 76, between the ring and the connector body section 50. The inner surface of the flange 130 cooperates with O-ring 72 to seal the carrier on the connector body section. The carrier is formed with a plurality of bores 132 (see also FIGS. 3, 5 and 6), each having small radially inwardly directed shoulders 134 at a forward end thereof. At the forward end, the entrance to each bore 132 is outwardly chamfered, as at 136, for guiding entrance of the end of a pin terminus. The alignment sleeve 42 for the fiber optic terminus bushing 32 is allowed to float a small amount longitudinally and radially within the bore 132 of the carrier. It is held in place within the carrier bore by a sleeve retaining ring 138 (FIG. 6) having an inwardly directed flange 140 that cooperates with shoulder 134 to capture the sleeve between the ring 138 and the carrier bore shoulder 134. Ring 138 is a press fit in the carrier bore and thus is fixedly secured to the carrier.

The pattern of alignment sleeve bore 132 of the carrier 46 (in a plane perpendicular to the connector axis) is identical to the pattern of the socket termini mounted in the connector body section 50. Therefore, when the carrier is mounted on the connector body section in the arrangement shown in FIG. 3, each alignment sleeve is fully and properly positioned on its respective terminus and is held in place thereon by the carrier. A fixed alignment pin 151 on the carrier is received in a hole 153 of the connector to help rotationally align the carrier with the connector.

The carrier is held to the connector body by a latching arrangement that cooperates with the spring clip 100. To this end, the carrier has a central bore which comprises an inner bore section 142 of a relatively large internal diameter. The central bore includes a latch section 144 of a decreased internal diameter that is positioned at the spring clip shank 102 and at the decreased diameter post section 86 when the carrier is mounted and latched on the connector body section 50. The bore latch section 144 and the bore inner section 142 are connected by an inclined bore shoulder 146.

Slidably mounted within the larger diameter inner bore section 142 is a cup-shaped plunger 150 having a forward head 154 and a rearwardly extending circumferential wall 156 that has an internal diameter equal to or just greater than the external diameter of the head 84 of post 82. The forwardmost end of carrier 46 is staked at the edges of the inner bore 142 to provide inwardly extending projections 158, protruding radially inwardly a sufficient distance to retain the slidably mounted floating plunger within the bore of the carrier. An inner most end 160 of the cup-shaped plunger normally touches the outwardly flared enlarged end portions of 104, 106, 108 and 110 of the spring clip 100 in assembled and latched condition of the carrier and connector body. An operator, such as a forwardly extending projection 166, is integrally formed on the forward head 154 of the plunger 150 to facilitate manually pressing the plunger to cause it to slide axially rearwardly (the right as view in FIG. 3).

In the latched condition illustrated in FIG. 3, the carrier flange 130 is snugly received around outer periphery of connector body section 50, cooperating with the O-ring 72 to seal the bores that receive and mount the socket termini. The flange 130 is positioned between the body section and the coupling ring and is radially spaced inwardly of the coupling ring to provide a space for receiving externally threaded walls of a mating coupling ring of a mating pin termini connector part (not shown). Spring 98 is compressed and bears against the rearward end of push cup 90, urging the cup forwardly so that its forward end 92 presses against a rear facing wall of the carrier at point 170. This tends to urge the carrier forwardly, away from the connector body. However, the outwardly flared enlarged ends 104, 106, 108 and 110 of the spring clip 100 are captured between the forwardly facing shoulder 146 of the carrier bore and the rearwardly facing shoulder 88 of the fixed post 82 thereby firmly latching the carrier to the connector body section.

To release the carrier, plunger 150 is simply pushed rearwardly (toward the right as view in FIG. 3). This is most conveniently accomplished by pressing the forward end of the assembled carrier and connector body against a flat surface to press against operating projection 166 thereby forcing the plunger rearwardly. As the plunger moves rearwardly, its forward end 160 presses against the enlarged ends 104, 106, 108 and 110 of the spring clip forcing the clip to slide rearwardly along the post to the position shown in FIG. 5. The length of the spring clip is less than the length of the decreased diameter section to allow this sliding motion. As the clip 100 is forced rearwardly, the outwardly flared enlarged forward ends are effectively cammed against the forwardly facing shoulder 146 of the carrier bore and are thereby forced radially inwardly. The large ends of the spring clip are forced inwardly by a sufficient distance to enable the reduced internal diameter latch section 144 of the carrier bore to clear the inwardly displaced enlarged ends of the spring clip (see FIG. 5) as the carrier is forced to the left by the spring urged action of pusher cup 90. In this position, the retainer is unlatched, although still substantially mounted on the connector body. When unlatched, the carrier may be removed by grasping it with the fingers and sliding it forwardly off the end of the connector body section. As the carrier is removed, all of the alignment sleeves, which are fixedly mounted in the carrier, are also removed, thereby exposing the ends of the optical fibers in the several termini mounted in the connector body. Now with the carrier removed, the exposed ends of the fibers may be readily cleaned and the retainers themselves may be thoroughly cleaned by a bore brush of appropriate diameter.

To reinstall the carrier, it is simply aligned with the connector body by axially rotating it until the carrier alignment pin enters the connector alignment hole. The carrier then is pushed rearwardly along the connector body to cause a rearwardly facing cam shoulder 180 on the carrier adjacent to the carrier latching section 144 to contact the spring clip enlarged ends and once again force these radially inwardly and rearwardly to allow the carrier to pass over the spring clip in its motion toward the rear. When the latching section 144 of the carrier passes the enlarged ends of the spring clip the latter again flare outwardly and the carrier is once again latched to the connector body.

It will be readily appreciated that instead of an operating projection 166 on plunger 150, there may be may be employed a slight depression centrally positioned on the forward end of the plunger that may be operated by the end of a sharp instrument, thereby avoiding inadvertent unlatching.

There have been described an arrangement for quickly and releasably assembling an alignment sleeve on an optical fiber socket terminus and a unique readily operable latching device for holding the two parts of the multi-channel connector together.

What is claimed is:

1. Apparatus for detachably connecting a first part to a second part comprising:

a post fixed to said first part and extending forwardly therefrom, said post having a head section having a first external diameter, a latch section of decreased external diameter and an inclined post shoulder between said sections, a resilient sleeve axially slidable on said post at said latch section having an outwardly flared end positioned at said shoulder, said second part having a bore receiving said post, said bore having an inner section of a first internal diameter and a latch section of decreased internal diameter, said bore latch section being positioned at said post latch section and having an inclined bore shoulder between said bore inner section and said bore latch section, said sleeve flared end being captured between said post shoulder and said bore shoulder, and means for axially shifting said sleeve relative to said shoulders.

2. The apparatus of claim 1 wherein said post head section has an external diameter slightly less than the internal diameter of said bore latch section.

3. The apparatus of claim 1 wherein said means for shifting comprises a plunger slidably mounted in said second part.

4. The apparatus of claim 3 wherein said plunger includes a plunger actuating projection extending outwardly of said second part.

5. The apparatus of claim 1 including spring means in said first part for urging said second part away from said first part.

6. The apparatus of claim 1 wherein said resilient sleeve is longitudinally split and includes a plurality of longitudinal slots extending from said flared end and dividing said flared end into a plurality of resilient spring fingers.

7. The apparatus of claim 1 wherein said sleeve is axially shiftable between a latched position in which said sleeve flared end is captured between and in contact with said post shoulder and said bore shoulder, and an unlatched position in which said sleeve flared end is spaced from and positioned behind said post shoulder and is positioned radially inwardly of said decreased internal diameter latch section of said bore, whereby in said unlatched position said post shoulder may be axially shifted post said bore shoulder.

* * * * *